(No Model.)
J. REESE.
MANUFACTURE OF PULLEYS.
No. 265,441. Patented Oct. 3, 1882.
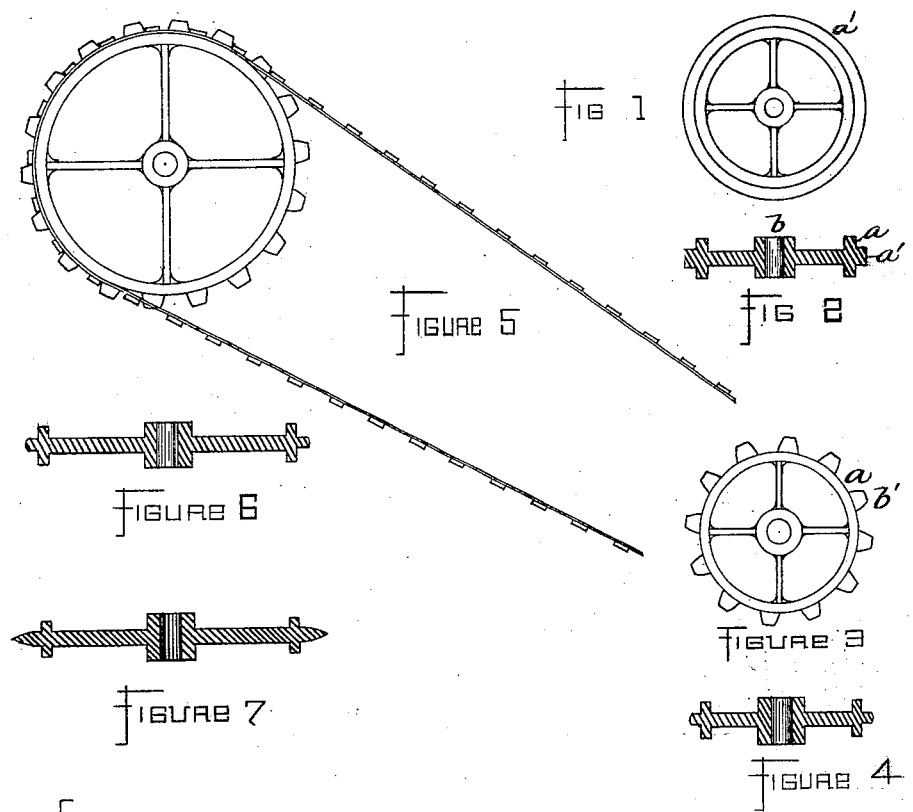

UNITED STATES PATENT OFFICE.

JACOB REESE, OF PITTSBURG, PENNSYLVANIA.

MANUFACTURE OF PULLEYS.

SPECIFICATION forming part of Letters Patent No. 265,441, dated October 3, 1882.

Application filed January 9, 1882. (No model.)

*To all whom it may concern:*

Be it known that I, JACOB REESE, a citizen of the United States, residing in Pittsburg, county of Allegheny and State of Pennsylvania, have invented a new and useful Improvement in Pulleys for the Transmission of Power by Metallic Belting; and I do hereby declare the following to be a full, clear, and exact description thereof, reference being had to the accompanying drawings, in which—

Figure 1 indicates a side view of the pulley when cast. Fig. 2 is a cross-section of the same. Fig. 3 is a side view of the pulley when finished. Fig. 4 is a cross-section of same. Fig. 5 is a side elevation of a finished pulley with a section of belt engaged on it. Fig. 6 is a cross-section of Fig. 5. Fig. 7 is a cross-section of one of my improved pulleys, having a greater bevel to the projecting ribs than shown in Figs. 3 and 5.

Heretofore pulleys have been mostly used in connection with leather and other friction-belts. In such cases the pulleys have been made with flat or slightly-rounded faces. When used for conveying positive motion the projections have been inserted or cast in shape with the pulley. By this method of manufacture it is very difficult, if not impossible, to produce a pulley having a series of projections on its face which are absolutely uniform in configuration and of a uniform distance from each other, and it is certainly impossible to produce a series of such pulleys by that method.

In order that metallic belting may become a success it is necessary that pulleys should be made with projections of a standard size and form in proportion with the openings in a standard belt, in order that they may properly bear upon each other, and that the belts of that standard may be interchangeable with any pulley of that standard.

The object of this improvement is the production of pulleys for transmtiting power by means of metallic belts having a series of projecting ribs of uniform conformation and of uniform distance from each other, in order that the belts and pulleys of any standard may be interchangeable, and that the strain may be uniformly distributed; and that others skilled in the art may be enabled to use my improvement, I will now describe my method of manufacture.

In the manufacture of my improved pulleys they are cast of any shape of arms and hub desired, and having a continuous central rib, $a'$, on their face $a$, as shown in Figs. 1 and 2. The pulley is then bored, as at $b'$, the face and rib $b$ turned. The pulley is then placed on a gear slotting or milling machine, the rib $a'$ is cut away at regular intervals, giving a bevel to the projections $b'$ which are left on the face of the pulley, and the pulley is finished in the form shown in Figs. 3 and 4 or 3 and 7, when it is ready for use.

When it is desired, these pulleys may be attached to the shafts by keys or screws, or they may be provided with clutches or combined with an arrangement so as to be used as friction-pulleys.

In the construction of pulleys by my method I am enabled to secure a solid rib and make every projection of a uniform height, thickness, and shape, and by slotting or milling the rib to produce a pulley or a series of pulleys having a series of projections conforming to a given standard, so that they may be made and kept in stock as an article of manufacture, as is now done with smooth-faced pulleys for use with leather or gum belts.

Having thus described my invention, what I claim, and wish to secure by Letters Patent, is—

1. A pulley for use with metallic belting, said pulley having centrally arranged upon its periphery a series of projections of uniform size and uniformly interspaced, substantially as and for the purpose specified.

2. The method herein described for forming pulleys for metallic belting, which consists, first, in casting the pulley with a continuous central rib on its periphery or face; secondly, truing and facing the central rib, and, finally, slotting or milling the rib to remove uniform portions of the rib at regular intervals, substantially as and for the purpose specified.

JACOB REESE.

Witnesses:
WALTER REESE,
FRANK M. REESE.